United States Patent
Purdy et al.

(10) Patent No.: US 8,325,738 B2
(45) Date of Patent: Dec. 4, 2012

(54) APPARATUS SYSTEM AND METHOD FOR WEB-BASED PHONE SERVICES

(75) Inventors: Thomas Jeffrey Purdy, Springville, UT (US); David Randal Elkington, Springville, UT (US); Matthew Coston Parker, Spanish Fork, UT (US); Kenneth David Krogue, Alpine, UT (US)

(73) Assignee: Insidesales.com, Provo, UT (US)

( * ) Notice: Subject to any disclaimer, the term of this patent is extended or adjusted under 35 U.S.C. 154(b) by 1462 days.

(21) Appl. No.: 11/755,676

(22) Filed: May 30, 2007

(65) Prior Publication Data

US 2008/0298560 A1 Dec. 4, 2008

(51) Int. Cl.
*H04L 12/28* (2006.01)

(52) U.S. Cl. ......... 370/401; 370/260; 370/271; 379/157

(58) Field of Classification Search .................. 370/252, 370/260, 271, 401, 389, 466, 467; 379/157–166
See application file for complete search history.

(56) References Cited

U.S. PATENT DOCUMENTS

| | | | |
|---|---|---|---|
| 5,241,586 A * | 8/1993 | Wilson et al. | 379/88.11 |
| 5,974,135 A * | 10/1999 | Breneman et al. | 379/265.04 |
| 6,185,194 B1 | 2/2001 | Musk et al. | |
| 6,192,123 B1 | 2/2001 | Grunsted | |
| 6,690,672 B1 | 2/2004 | Klein | |
| 6,834,048 B1 | 12/2004 | Cho | |
| 6,870,828 B1 | 3/2005 | Giordano, III | |
| 2002/0090964 A1* | 7/2002 | Harder | 455/466 |
| 2002/0131561 A1* | 9/2002 | Gifford et al. | 379/67.1 |
| 2003/0081591 A1* | 5/2003 | Cheung et al. | 370/352 |
| 2003/0088619 A1* | 5/2003 | Boundy | 709/204 |
| 2004/0071281 A1* | 4/2004 | Rashid | 379/210.02 |
| 2005/0091059 A1* | 4/2005 | Lecoeuche | 704/270.1 |
| 2008/0071633 A1* | 3/2008 | Ozkan et al. | 705/26 |
| 2009/0100137 A1* | 4/2009 | Venkitaraman et al. | 709/205 |
| 2011/0211572 A1* | 9/2011 | Campion et al. | 370/352 |
| 2011/0258627 A1* | 10/2011 | Faraj et al. | 718/100 |

* cited by examiner

*Primary Examiner* — Hassan Phillips
*Assistant Examiner* — Ajay Cattungal

(57) ABSTRACT

An apparatus, system, and method are disclosed for providing web-based phone services. Phone calls are initiated by a user control on a web page. A calling module uniquely identifies the telephone call and initiates calling by a dialer. Once the telephone call is established, auxiliary functions such as call monitoring, recording, transfer, or conference calling may be initiated for the call. Additional controls corresponding to the auxiliary functions may provided on the web page or a related web page. The web pages used to provide the user controls may stateless web pages.

18 Claims, 9 Drawing Sheets

800

810

| Customer #: | 143727 |
|---|---|
| Name: | Jeffery Miller |
| Address: | 148 S. Birch Street #215 |
| | Springfield MO 65801 |
| Product #: | 43217 |
| Purchase Date: | 5/18/07 |
| Warranty: | 12 month |
| Notes: | |

820

Call

FIG. 8A

APPARATUS SYSTEM AND METHOD FOR WEB-BASED PHONE SERVICES

BACKGROUND OF THE INVENTION

1. Field of the Invention

This invention relates to telephone services and more particularly relates to web-based telephone services.

2. Description of the Related Art

Recent years have witnessed an explosion of developments in both voice and data networking. Sophisticated phone systems used in call centers provide such services as call monitoring and recording, playing pre-recorded messages, call transfer, conference calling, interactive voice response (IVR) programs, and retrieving customer data from a database. At the same time, web-based programs have become increasingly sophisticated, enabling users to use web-based replacements for many of the applications formerly installed on individual workstations, such as word processing, spreadsheets, and databases.

Development of web-based control of telephone services has lagged that of other application areas, due to the difficulty of managing the amount of state information associated with telephone calls via virtually stateless web pages. Cookies are widely used in such applications as ecommerce shopping baskets to make a web site stateful, but the amount of data that can be managed via cookies is limited. In addition, many users set their web browsers to refuse cookies, due to abuse of cookies by spyware.

SUMMARY OF THE INVENTION

From the foregoing discussion, it should be apparent that a need exists for an apparatus, system, and method that provide phone services from web pages. Beneficially, such an apparatus, system, and method would facilitate management of telephone calls from a web page. Phone call management could be performed using stateless web pages that do not require cookies. Control and maintenance of telephone call state information could be leveraged by use of standard telephony equipment, such as dialers and PBX systems.

The present invention has been developed in response to the present state of the art, and in particular, in response to the problems and needs in the art that have not yet been fully solved by currently available web-based phone services. Accordingly, the present invention has been developed to provide an apparatus, system, and method for web-based phone services that overcome many or all of the above-discussed shortcomings in the art.

The apparatus to provide web-based phone services is provided with a plurality of modules configured to functionally execute the necessary steps of providing web-based phone services. These modules in the described embodiments include a user interface module that displays a user interface control to initiate a telephone call, a calling module that uses a dialer to establish the phone call, a data store interface module that stores and retrieves data associated with phone numbers and phone calls, and an auxiliary function module that invokes auxiliary functions for a telephone call.

The apparatus, in one embodiment, is configured to initiate a phone call when a submit button on a web form is activated. In a further embodiment, the apparatus may be configured to retrieve status information corresponding to the phone call. The apparatus is further configured, in one embodiment, to display on a web page a user interface control that activates the auxiliary function. In various embodiments, the auxiliary function may include recording the phone call, playing a user selected message, connecting the call to a monitoring party, transferring the call, calling a second party, calling a third party, and bridging the second party to the third party.

A system of the present invention is also presented to provide web-based phone services. The system, in one embodiment, includes a web server that delivers web pages that display a user interface control, a call manager that generates a unique call identifier, a data store for storing the unique call identifier, and a dialer that initiates calls on a telephone network. The system may further include a telephone gateway to a public telephone network, a PBX server, a VoIP switch, or termination hardware.

A method of the present invention is also presented for providing web-based phone services. The method in the disclosed embodiments substantially includes the steps necessary to carry out the functions presented above with respect to the operation of the described apparatus and system. In one embodiment, the method includes displaying a user interface control for initiating a telephone, receiving activation of the user interface control, initiating a telephone call, providing a unique telephone call identifier, storing the identifier, displaying a second user interface control to initiate a selected auxiliary function, receiving activation of the second user interface control, retrieving the unique telephone call identifier, providing the identifier to a dialer, and requesting the dialer to invoke the selected auxiliary function. The method also may include retrieving status information for the call associated with the unique telephone call identifier. In a further embodiment, the method includes invoking another auxiliary function such as recording the phone call, playing a user selected message, calling a second party, calling a third party, and bridging the second party to the third party.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 8A is a block diagram illustrating one embodiment of a click-to-call customer record in accordance with the present invention.

DETAILED DESCRIPTION OF THE INVENTION

Figure 1:
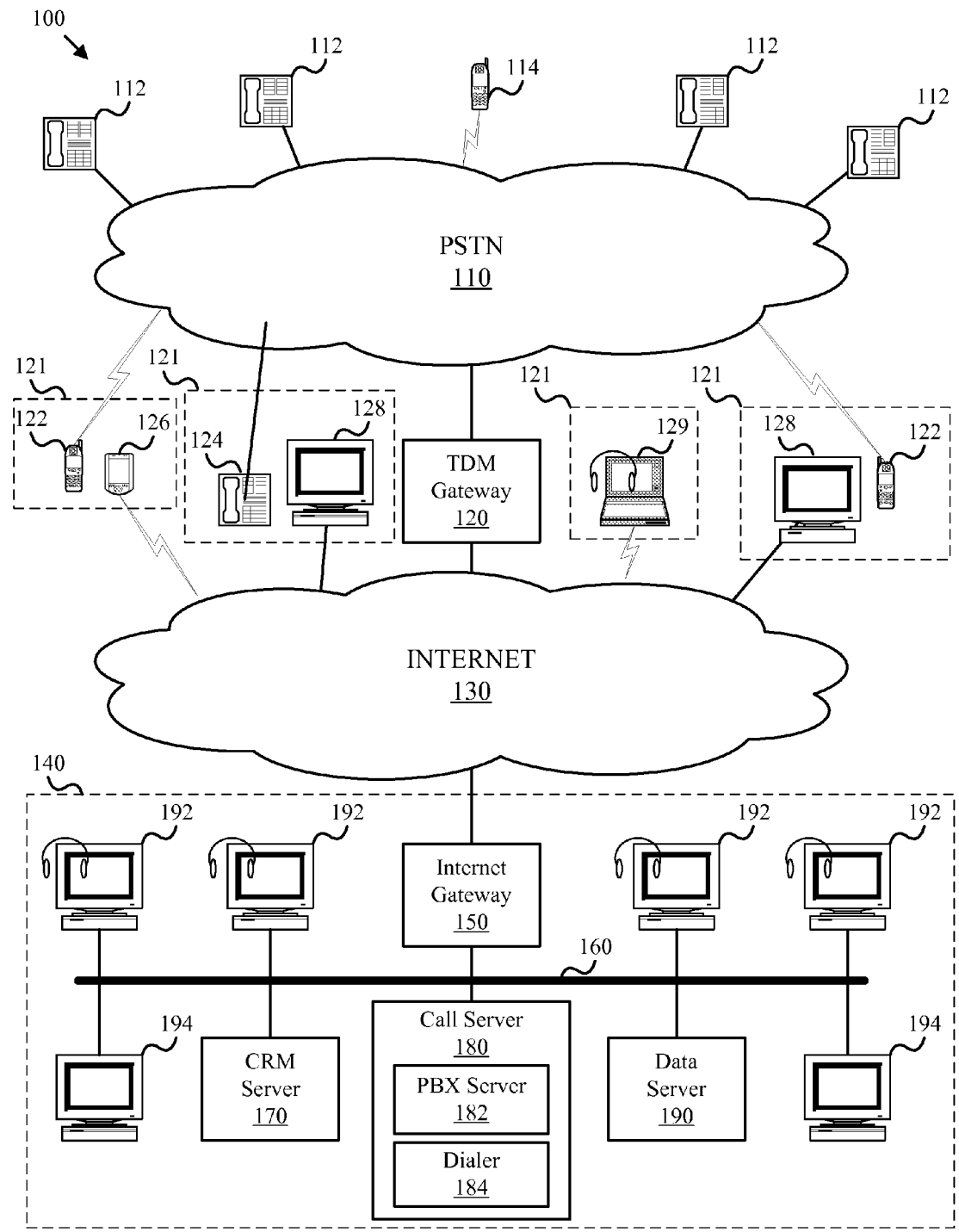
FIG. 1 is a schematic block diagram illustrating one embodiment of a typical networking environment in which the present invention may be deployed.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium or computer-readable medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a typical networking environment 100 in which the present invention may be deployed. As depicted, the networking environment 100 includes such components as a public switched telephone network (PSTN) 110, client phones 112, client wireless phones 114, a TDM gateway 120 connecting the PSTN to an internet 130, remote agent stations 121, an agent wireless phone 122, an agent phone 124, a wirelessly-connected PDA 126, remote agent workstations 128, a wirelessly-connected agent workstation 129, a call center 140, an internet gateway 150 connecting a local area network 160 to the internet 139, servers on the local network, such as a customer relationship management (CRM) server 170, a call server 180 comprising a PBX Server 182 and Dialer 184, or data server 190, local agent workstations 192, and control workstations 194.

In one embodiment, the local area network 160 in the networking environment 100 resides within a call center 140 that uses VoIP to route calls over the internet to service customers on the PSTN 110. The call server 180 in the call center 140 provides such services as recording of telephone conversations, discreet monitoring, routing, and conferencing. The various servers in the call center 140 are integrated to provide access to customer data when a call is established, both to local agent workstations 192 and remote agent stations 121.

Figure 2:
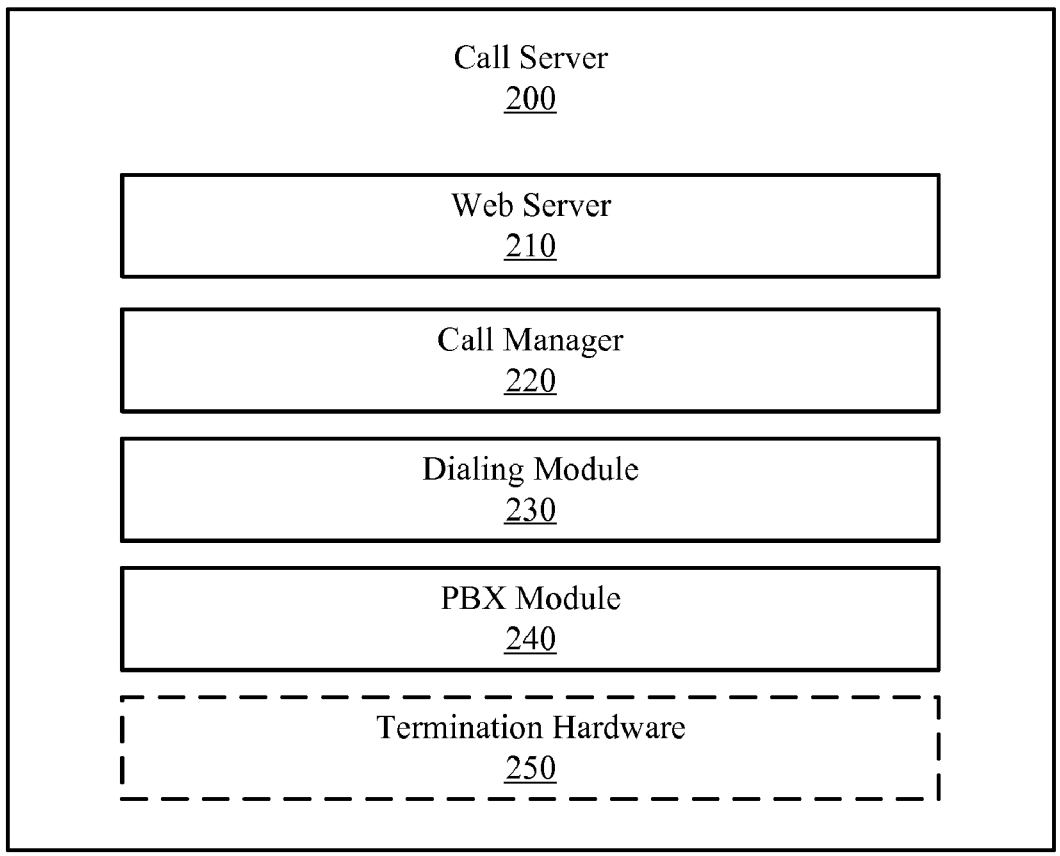
FIG. 2 is a schematic block diagram illustrating one embodiment of a web-based phone service system in accordance with the present invention.

FIG. 2 is a schematic block diagram illustrating one embodiment of a call server 200. The call server 200 includes a web server 210, a call manager 220, a dialing module 230, a PBX module 240, and termination hardware 250. The call server 200 facilitates establishment and management of telephone calls.

The web server 210 provides web pages to users on a network, such as a call center local area network or the internet. In certain embodiments, the users may be agents, customer service reps, or the like. In one embodiment, the web server 210 provides one or more web pages that display a user interface control to establish a phone call and one or more user interface controls that invoke auxiliary functions associated with the phone call, such as initiating a business transaction, recording the phone call, playing a user selected message, connecting the call to a monitoring party, transferring the call, or establishing a telephone conference including three or more parties.

The call manager 220 facilitates management of telephone calls. In one embodiment, the call manager 220 receives notification that the user has activated a user interface control to initiate a phone call. The call manager 220 then provides a unique call identifier corresponding to the telephone call to the dialing module 230 and directs the dialing module 230 to establish a telephone call. In some embodiments, the call manager 220 may retrieve a telephone number from a database and provide it to the dialing module 230. The call manager 220 may receive notification that the user has activated a user interface control to initiate an auxiliary function, and in response thereto, initiate the auxiliary function by providing the unique call identifier to the module performing the auxiliary function. In various embodiments, auxiliary functions are performed by the call manager 220, the dialing module 230, the PBX module 240, or the call termination hardware 250.

The dialing module 230 establishes telephone calls. In one embodiment, the dialing module 230 receives a unique call identifier, establishes a telephone call, and notifies the call manager that the call has been established. Various embodiments of the dialing module 230 incorporate auxiliary functions such as retrieving telephone numbers from a database, comparing telephone numbers against a restricted calling list, transferring a call, conferencing a call, monitoring a call, playing recorded messages, detecting answering machines, recording voice messages, and providing interactive voice response (IVR) capabilities. In some instances, the dialing module 230 directs the PBX module 240 to perform the auxiliary functions.

The PBX module 240 connects a private phone network to the public switched telephone network (PSTN) or the like. The dialing module 230 directs the PBX module 240 to connect a line on the private phone network with a number on the PSTN. In some embodiments, the PBX module 240 provides some of the auxiliary functions invoked by the dialing module 230.

The termination hardware 250 routes calls from a local network to the public switched telephone network (PSTN). In one embodiment, the termination hardware 250 interfaces to conventional phone terminals. In some embodiments and instances, the termination hardware 250 provides some of the auxiliary functions invoked by the dialing module 230.

Figure 3:
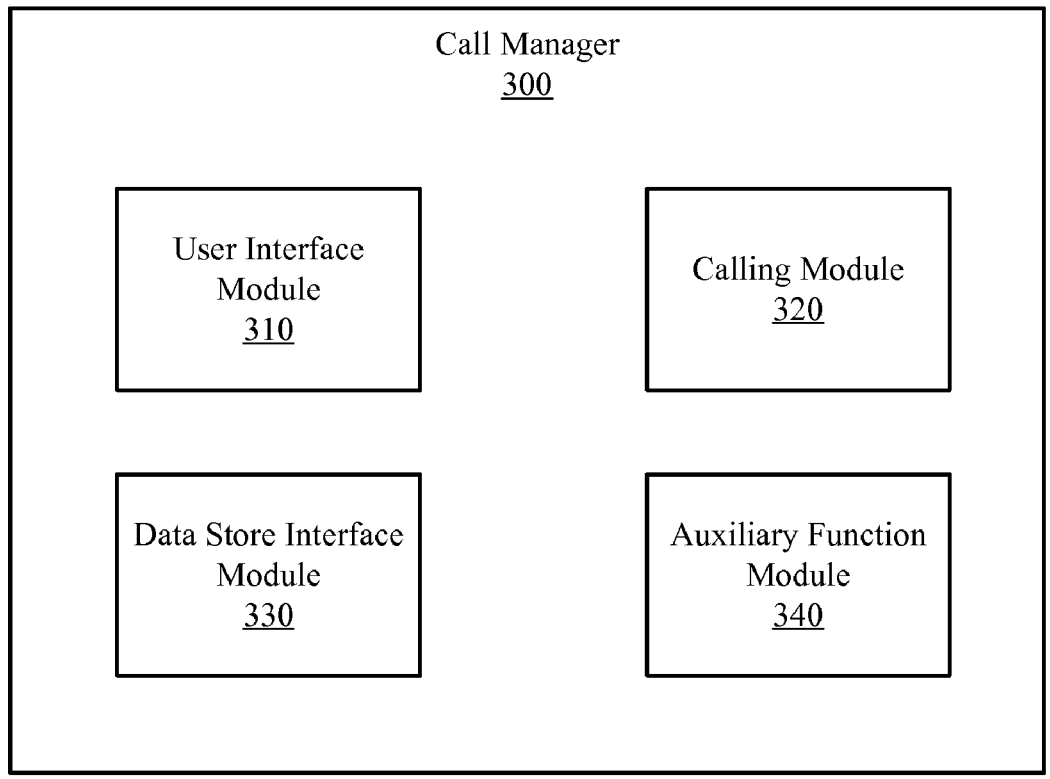
FIG. 3 is a schematic block diagram illustrating one embodiment of a call manager apparatus in accordance with the present invention.

FIG. 3 is a schematic block diagram illustrating one embodiment of a call manager apparatus 300. The call manager 300 includes a user interface module 310, a calling module 320, a data store interface module 330, and an auxiliary function module 340. The call manager apparatus 300 manages the establishment of telephone calls and invocation of auxiliary functions.

The user interface module 310 interacts with the web server 210 to receive notification that the user has initiated a phone call or invoked an auxiliary function and to report status information regarding phone calls and auxiliary functions. In some embodiments, the user interface module 310 reports to the web server 210 which auxiliary functions are available. In one embodiment, when a phone call is initiated, the user interface module 310 generates a unique call identifier and provides it to the calling module 320. In one embodiment, when the unique call identifier has been associated with a telephone number, the user interface module 310 requests customer data from the data store interface module 330 for display to the user. When an auxiliary function is initiated, the user interface module 310 retrieves the unique call identifier associated with the call and provides it to the auxiliary function module 340.

The calling module 320 interacts with the dialing module 220 to establish telephone calls in response to user requests received by the user interface module 310. In one embodiment, the calling module 320 receives a unique call identifier from the user interface module 310. In one embodiment, the calling module 320 requests a phone number from the data store interface module 330. The calling module 320 notifies the user interface module 310 that the unique call identifier is associated with a telephone number, so that the user interface module 310 can retrieve customer data from the data store interface module 330 and provide it to the web server 210 for display to the user.

The data store interface module 330 interacts with databases to retrieve data required, and to store data obtained by various modules of the call manager 300. In one embodiment, the calling module 320 requests that the data store interface module 330 retrieve a telephone number from a database and compare it to a "do not call" list in another database. In one embodiment, the user interface module 310 requests the data store interface module 330 to retrieve customer data associated with a telephone number from a database, for display to the user, then requests the data store interface module 330 to store updated customer data obtained from the user back into the database.

The auxiliary function module 340 invokes auxiliary functions to be performed in conjunction with a telephone call. In various embodiments, auxiliary functions include recording the phone call, playing a user selected message, connecting the call to a monitoring party, transferring the call, or establishing a conference call. In various embodiments, auxiliary functions are performed by the call manager 300, the dialing module 230, the PBX module 240, or the termination hardware 250.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
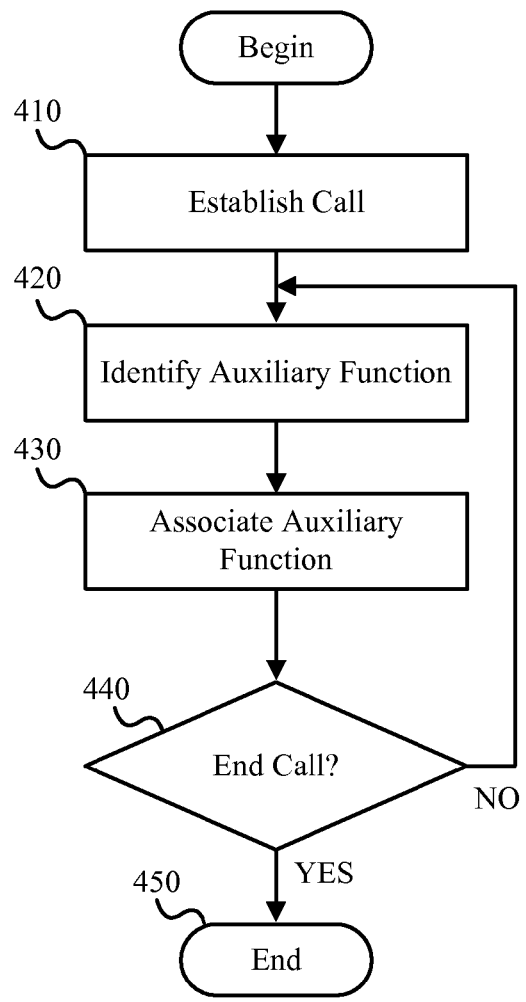
FIG. 4 is a schematic flow chart diagram illustrating one embodiment of a call management method in accordance with the current invention.

FIG. 4 is a schematic flow chart diagram illustrating one embodiment of a call management method 400. The call management method 400 includes an establish call operation 410, an identify auxiliary function operation 420, an associate auxiliary function operation 430, and an end call test 440. The call management method 400 is performed in conjunction with the call manager 300 and facilitates management of telephone calls.

Figure 5:
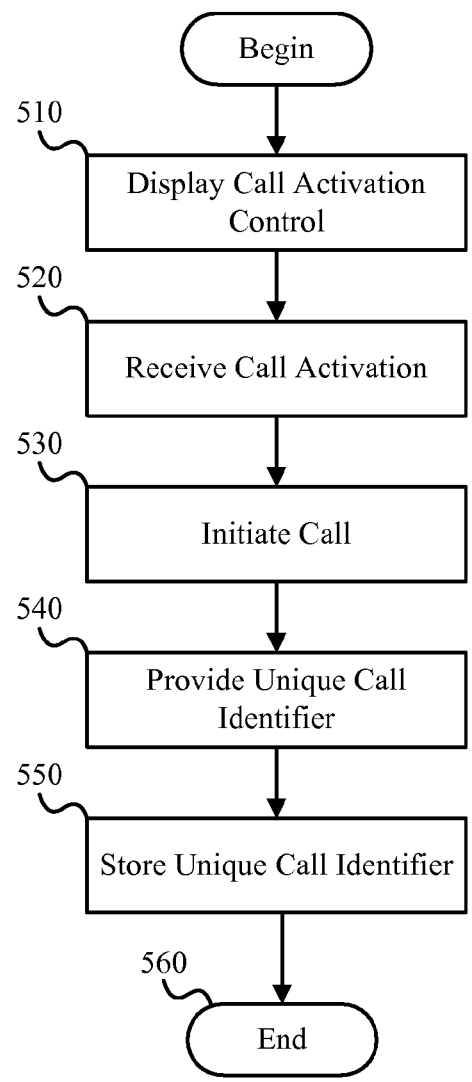
FIG. 5 is a schematic flow chart diagram illustrating one embodiment of an establish call method in accordance with the present invention.

The establish call operation 410 is performed in conjunction with the web-based phone service system 200 and/or the networking environment 100. The user initiates the call by activating a control on a web page. In one embodiment, the call manager 220 directs the dialing module 230 to establish a telephone call and associates a unique call identifier with the call. The establish call method 500 depicted in FIG. 5 is one embodiment of the establish call operation 410.

Figure 6:
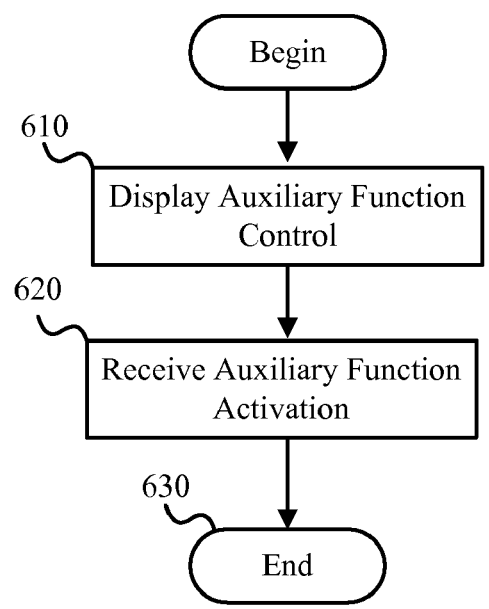
FIG. 6 is a schematic flow chart diagram illustrating one embodiment of an identify auxiliary function method in accordance with the present invention.

The identify auxiliary function operation 420 is performed in conjunction with the web-based phone service system 200. In one embodiment, the web server 210 displays a web page with one or more user interface controls that the user can activate to initiate an auxiliary function. The identify auxiliary function operation 420 then receives activation of the user interface control. The identify auxiliary function method 600 depicted in FIG. 6 is one embodiment of the identify auxiliary function operation 420.

Figure 7:
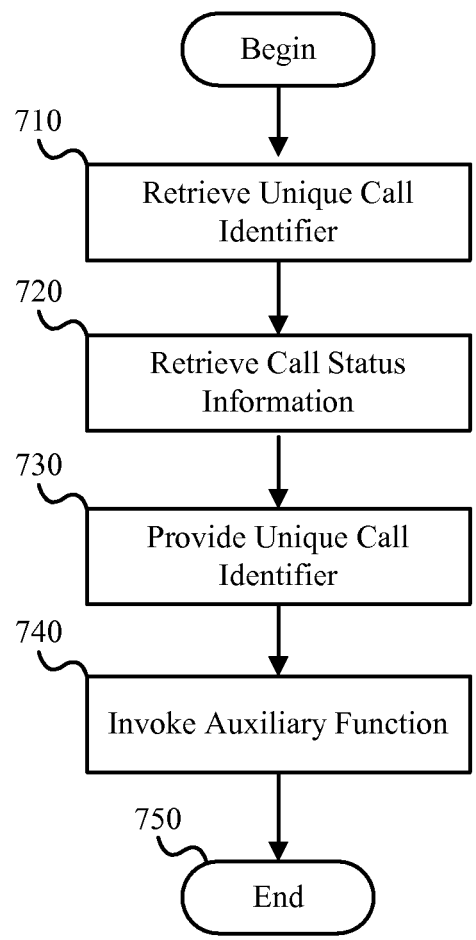
FIG. 7 is a schematic flow chart diagram illustrating one embodiment of an associate auxiliary function method in accordance with the present invention.

The associate auxiliary function operation 430 is performed in conjunction with the web-based phone service system 200. In one embodiment, the call manager 220 retrieves the unique call identifier and call status from the dialing module 230. The call manager 220 then provides the unique call identifier to the selected auxiliary function. The associate auxiliary function method 700 depicted in FIG. 7 is one embodiment of the associate auxiliary function operation 430.

The end call test 440 determines whether the telephone call should be ended upon completion of the associate auxiliary function operation 430. If the telephone call is not to be ended, the call management method 400 continues with the identify auxiliary function operation 420. Otherwise, the call management method 400 ends 450.

FIG. 5 is a schematic flow chart diagram illustrating one embodiment of an establish call method 500. The establish call method 500 includes a display call activation control operation 510, a receive call activation operation 520, an initiate call operation 530, a provide unique call identifier operation 540, and a store unique call identifier operation 550. The establish call method 500 establishes a telephone call and associates a unique call identifier with the call.

The display call activation control operation 510 displays a call activation user interface control on a web page. In certain embodiments, the web server 210 provides a web page with the call activation user interface control. In some embodiments, the call activation control is a submit button on a web form.

The receive call activation operation 520 receives activation of the call activation user interface control. In one embodiment, the web server 210 receives activation of the call activation user interface control and notifies the user interface module 310 that the control has been activated. Notification that the user has activated the call activation user interface control may also be passed to the calling module 320.

The initiate call operation 530 initiates a telephone call. In one embodiment, the calling module 320 directs the dialing module 230 to establish a telephone call. In one embodiment, the calling module 320 first directs the data store interface module 330 to retrieve a telephone number, then passes it to the dialing module 230 to establish the call. The provide unique call identifier operation 540 provides a unique call identifier to be associated with the call. In one embodiment, the calling module 320 generates the unique call identifier and passes it to the dialing module 230.

The store unique call identifier operation 550 stores the unique call identifier associated with the established call. In one embodiment, the unique call identifier is stored in the dialing module, and exists only through the duration of the call. In another embodiment, the data store interface module 330 stores the unique call identifier in a database, to maintain a persistent record of the call. The establish call method 500 then ends 560.

FIG. 6 is a schematic flow chart diagram illustrating one embodiment of an identify auxiliary function method 600. The identify auxiliary function method includes a display auxiliary function control 610, and a receive auxiliary function activation operation 620. The identify auxiliary function method 600 identifies the auxiliary function to be performed in conjunction with the established telephone call.

The display auxiliary function control 610 displays a user interface control to activate an auxiliary function. In one embodiment, the user interface module 310 receives a list of the available auxiliary functions from the auxiliary function module 340. The user interface module 310 then directs the web server 210 to generate a web page with auxiliary function activation user interface controls for each of the available auxiliary functions. The user may subsequently select the auxiliary function to be activated in conjunction with the established telephone call.

The receive auxiliary function activation operation 620 receives activation of the user interface control associated with the auxiliary function. In one embodiment, the web server 210 notifies the user interface module 310 which auxiliary function activation user interface control the user has activated. The identify auxiliary function method 600 then ends 630.

FIG. 7 is a schematic flow chart diagram illustrating one embodiment of an associate auxiliary function method 700. The associate auxiliary function method 700 includes a retrieve unique call identifier operation 710, a retrieve call status information operation 720, a provide unique call identifier operation 730, and an invoke auxiliary function operation 740. The associate auxiliary function method 700 associates the unique call identifier associated with the established call with the auxiliary function activated by the user.

The retrieve unique call identifier operation 710 retrieves the unique call identifier associated with the established call. In one embodiment, the calling module 320 retrieves the unique call identifier from the dialing module 230. The retrieve call status information server operation 720 retrieves the status of the established telephone call. In one embodiment, the calling module 320 retrieves the status of the established call from the dialing module 230.

The provide unique call identifier operation 730 provides the unique call identifier. In one embodiment, the calling module 320 provides the unique call identifier to the auxiliary function module 340. In one embodiment, providing the unique call identifier invokes the selected auxiliary function. The invoke auxiliary function operation 740 invokes the selected auxiliary function for the established telephone call. In one embodiment, the calling module 320 directs the auxiliary function module 340 to invoke the auxiliary function selected by the user. The associate auxiliary function method 700 then ends 750.

FIG. 8A is a block diagram illustrating one embodiment of a click-to-call web page 800. The click-to-call web page 800 includes client data 810 and a click-to-call button 820. The click-to-call web page 800 facilitates establishing a telephone call to a selected client. The click-to-call web page 800 displays customer data 810 on a local agent workstation 192 or remote agent station 121. The user clicks the click-to-call button 820 to establish a phone call with the customer represented by the customer data 810.

Figure 8B:
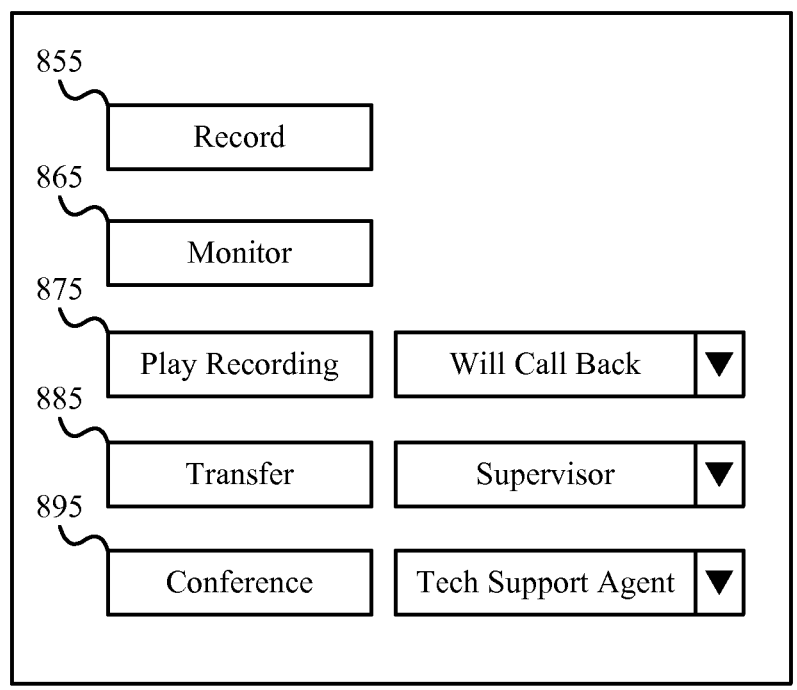
FIG. 8B is a block diagram illustrating one embodiment of an auxiliary function dialog in accordance with the present invention.

FIG. 8B is a block diagram illustrating one embodiment of an auxiliary function dialog 850. The auxiliary function dialog 850 includes a record call button 855, a monitor call button 865, a play recording control 875, a transfer call control 885, and a conference call control 895. The auxiliary function dialog 850 is one example of a user interface that facilitates invoking auxiliary functions to be performed in conjunction with an established phone call.

The auxiliary function dialog 850 may be a modeless dialog or a toolbar containing user interface controls that may be displayed when the user has activated the click-to-call button 820. The auxiliary function dialog 850 displays user interface controls that to invoke the auxiliary functions that are available for the established call. For example, the record call button initiates recording of the established call, and the monitor call button 865 requests a monitoring agent to monitor the call. The play recording control 875 plays a recording selected from a drop-down menu. In some embodiments, the user may be disconnected while the recording plays, so the user will be available to initiate another phone call. The transfer control 885 transfers the call to a second user selected from a drop-down menu and disconnects the first user, so they are available to initiate another phone call. The conference call control 895 establishes a conference call with a user selected from a drop-down menu.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing web-based phone services while minimizing the maintenance of call-state information at an agent's web-browser, the method comprising:
    displaying a first user interface control on a web page that enables a user to command the initiation of a telephone call to a first party;
    receiving user activation of the first user interface control;
    initiating a telephone call;
    producing a unique telephone call identifier, the identifier uniquely corresponding to the initiated telephone call;
    providing the produced unique telephone call identifier to a dialer;
    optionally storing the produced unique telephone call identifier;
    displaying a second user interface control on a web page that enables a user to command the activation of an auxiliary function for the initiated telephone call;
    receiving user activation of the second user interface control;
    retrieving the produced unique telephone call identifier;
    providing the produced unique telephone call identifier to a performance module configured to perform the auxiliary function corresponding to the received user activation command; and
    invoking the auxiliary function corresponding to the received user activation command for a telephone call corresponding to the produced unique telephone call identifier.

2. The method of claim 1, further comprising retrieving status information for the telephone call corresponding to the produced unique identifier; and
    wherein invocation of the auxiliary function corresponding to the received user activation command is contingent upon the returned status of the telephone call corresponding to the produced unique telephone call identifier.

3. The method of claim 1, wherein the auxiliary function is selected from the group consisting of recording a phone call, playing a user selected message, connecting a call to a monitoring party, transferring a call, calling a second party, calling a third party, and bridging a second party to a third party.

4. An apparatus to provide web-based phone services while minimizing the maintenance of call-state information at an agent's web-browser, the apparatus comprising:
    a user interface module configured to produce a user interface control on a web page that enables a user to initiate a telephone call, the user interface module further configured to receive user activation of the user interface control;
    a calling module configured to initiate a telephone call through a dialer, the calling module further configured to associate a unique telephone call identifier to a dialed telephone call;
    a data store interface module configured to store and retrieve the associated unique telephone call identifier; and
    an auxiliary function module configured to invoke an auxiliary function for a telephone call corresponding to an associated unique telephone call identifier.

5. The apparatus of claim 4, wherein the user interface module is configured to produce a user interface control that is a submit button on a web form.

6. The apparatus of claim 4, wherein the user interface module is further configured to initiate display of a second user interface control on a web page that enables the user to initiate the auxiliary function for which the auxiliary function module is configured, the user interface module further configured to receive user activation of the second user interface control.

7. The apparatus of claim 4, wherein the data store interface module is further configured to retrieve status information for a telephone call associated to a stored unique telephone call identifier; and
    wherein said auxiliary function module is configured to invoke the corresponding auxiliary function upon receiving one or more selected returned statuses of the telephone call corresponding to the stored unique telephone call identifier.

8. The apparatus of claim 4, wherein the auxiliary function module is configured to perform an auxiliary function selected from the group consisting of recording a phone call, playing a user selected message, connecting a call to a monitoring party, transferring a call, calling a second party, calling a third party, and bridging a second party to the third party.

9. A system to provide web-based phone services while minimizing the maintenance of call-state information at an agent's web-browser, the system comprising:
    a web server configured to deliver web pages;
    an agent workstation remote from said web server, said agent workstation being configured to display web pages that include a user interface control configured to receive input from a user located at said agent workstation;
    said web server being further configured to receive user input from said agent workstation that comprises commands to initiate a telephone call between an agent located at said agent workstation and a distant party;
    said system further comprising a call manager configured to initiate telephone contact to an agent located at said agent workstation, said manager being further configured to generate a unique telephone call identifier corresponding to that initiated telephone contact;
    said system further comprising a data store configured to store a generated unique telephone call identifier; and said system further comprising a dialer configured to initiate telephone calls on a telephone network between an agent configured for telephone contact and the distant party, the dialer further configured to receive the unique telephone call identifier associated to that telephone contact.

10. The system of claim 9, wherein said dialer further comprises a telephone gateway configured to initiate telephone calls on a public telephone network.

11. The system of claim 9, wherein said call manager comprises a PBX server.

12. The system of claim 11, wherein the PBX server is a VoIP switch.

13. The system of claim 11, wherein the PBX server comprises termination hardware.

14. A computer program product for providing web-based phone services while minimizing the maintenance of call-state information at an agent's web-browser, said program product comprising program code stored to one or more non-transitory computer-readable storage media, said program code executable by a computing system to perform the functions of:

generating a web page including browser-executable instructions functional to display a first user interface control on a web page that enables a user to command the initiation of a telephone call to a first party;

receiving user activation of the first user interface control; initiating a telephone call;

producing a unique telephone call identifier, the identifier uniquely corresponding to the initiated telephone call;

providing the produced unique telephone call identifier to the dialer;

optionally storing the produced unique telephone call identifier;

generating a web page including browser-executable instructions functional to display a second user interface control on a web page that enables a user to command the activation of an auxiliary function for the initiated telephone call;

receiving user activation of the second user interface control;

retrieving the produced unique telephone call identifier;

providing the produced unique telephone call identifier to a performance module configured to perform the auxiliary function corresponding to the received user activation command; and requesting the module invoke the auxiliary function corresponding to the received user activation command for a telephone call corresponding to the produced unique telephone call identifier.

15. The computer program product of claim 14, wherein said program code is executable by a computing system to perform the further function of retrieving status information for the telephone call corresponding to the produced unique telephone call identifier; and wherein invocation of the auxiliary function corresponding to the received user activation command is contingent upon the returned status of the telephone call corresponding to the produced unique telephone call identifier.

16. The computer program product of claim 14, wherein in the generation of a web page including browser-executable instructions functional to display a second user interface control, said web page displays that the auxiliary function is one of recording a phone call, playing a user selected message, connecting a call to a monitoring party, transferring a call, calling a second party, calling a third party, and bridging a second party to the third party.

17. The computer program product of claim 14, wherein the module configured to perform the auxiliary function corresponding to the received user activation command is the dialer to which was provided the produced unique telephone call identifier.

18. The computer program product of claim 14, wherein said program code is executable by a computing system to perform the further function of storing the unique telephone call identifier.

* * * * *